UNITED STATES PATENT OFFICE.

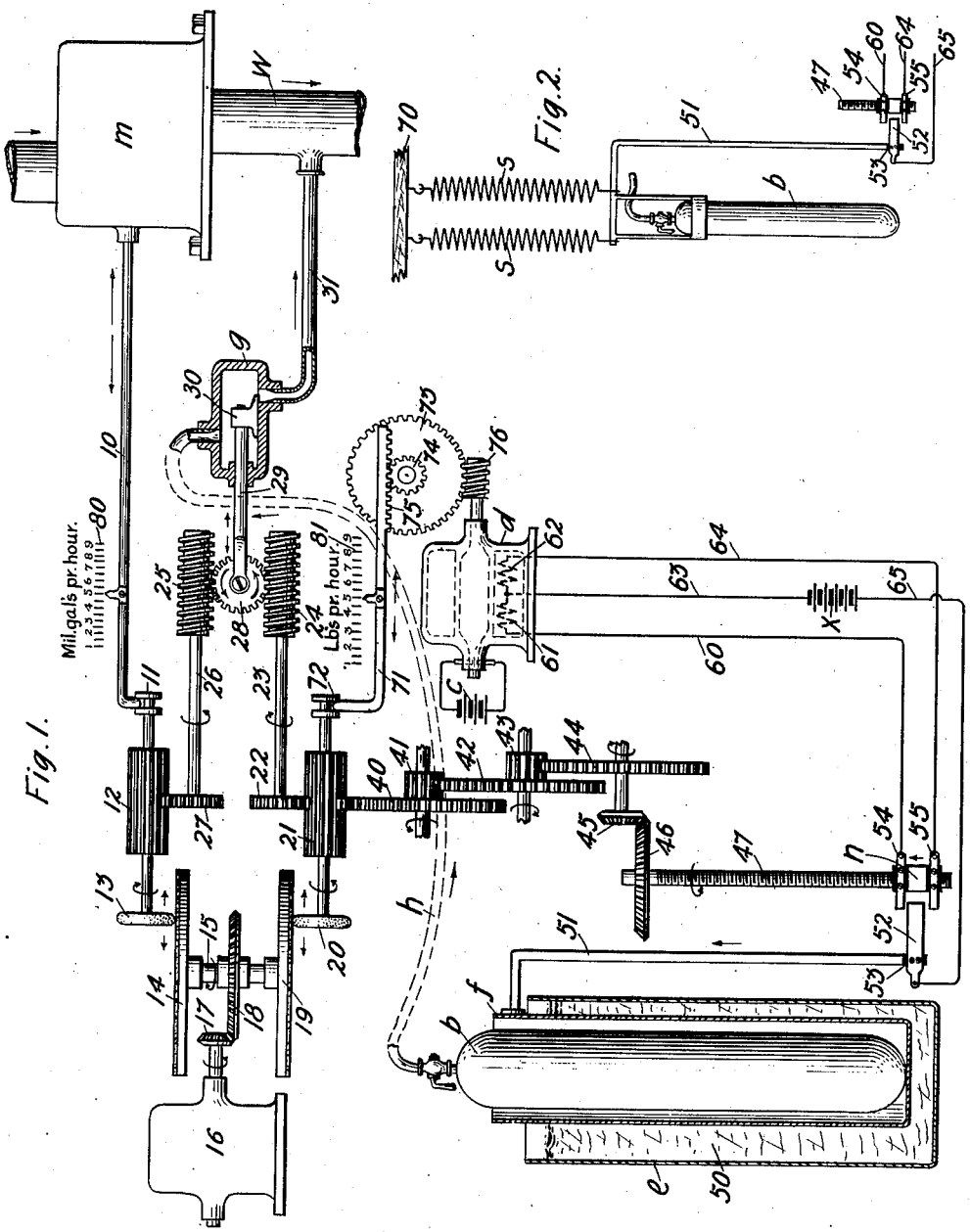

FRANK M. LEAVITT, OF SMITHTOWN, NEW YORK, ASSIGNOR TO LEAVITT-JACKSON ENGINEERING COMPANY, OF BROOKLYN, NEW YORK, A CORPORATION OF NEW YORK.

PURIFICATION OF WATER.

1,088,232.  Specification of Letters Patent.  Patented Feb. 24, 1914.

Application filed October 8, 1912. Serial No. 724,512.

*To all whom it may concern:*

Be it known that I, FRANK M. LEAVITT, a citizen of the United States, residing at Smithtown, in the county of Suffolk and State of New York, have invented certain new and useful Improvements in the Purification of Water, of which the following is a specification.

This invention relates to the introduction of a chemical agent into a stream of water for the purification or other treatment of the water. Its principal application is for the purification of the water supplied to a city through its aqueduct, but it is equally applicable to the purification of streams or water courses and to the treatment of sewage or the effluent from sewage purification plants. The chemical agent will usually be in liquid or gaseous form but it may be in solid form. The difficulty which my invention is designed to meet is that the flow in the aqueduct or water course is liable to frequent fluctuation, whereas the chemical treatment requires that the purifying agent be introduced in some certain definite proportion, that is to say, that a certain weight of the chemical agent shall be introduced to each million gallons or other determined quantity of water flowing. When the chemical agent is used in the gaseous form a difficult condition is presented.

For the purification of water supplied to cities, for the destruction of harmful bacteria in the water, the purifying agent now most commonly used is chlorin gas. The invention is therefore described as designed for controlling the introduction into a variable water supply of the required proportion of chlorin, say for example, one pound of chlorin to a given quantity, such as one million gallons, of water, or it may be one part by weight of chlorin gas and two million parts of water. Such a gas is held in bottles under pressure in liquid form; when the outlet valve is opened the liquid is partly relieved of pressure, and the chlorin, in gaseous form, passes out through a tube or pipe into the water-main, the rate of flow depending upon the difference between the pressure of the stored gas and the pressure in the water-main; the rate in weight per time unit depending also on the density of the gas (*i. e.*, its pressure and temperature). For these reasons a predetermined amount of gas by weight cannot be caused to flow by simply providing a fixed orifice or passage. The rate of flow of water through the main is subject to wide variation, as is also the pressure or head, and the desired amount of gas to be supplied in a given time will vary according to the rate of flow.

This invention provides an improved method of producing these desired results; and an automatic means, adapted to operate in accordance with the improved method, by which a desired or predetermined weight of gas may be introduced into the water in proportion to the volume of water flowing through the water-main at any interval, irrespective of the pressure or temperature of the gas and of the pressure against which it is introduced. With this object there is provided a water meter or flow indicator of any known form and suitable arrangement the variations in which produce a mechanical movement; this mechanical movement is made an element in controlling the rate at which the gas is introduced, and a mechanical movement due to the variation in weight of the gas supplied coöperates with the first named mechanical movement, to control the delivery of the gas into the water; that is to say, the valve or orifice through which the gas is introduced is controlled by the joint operation of a water meter or flow indicator and the variation in gravity of the gas supplied.

In describing this improvement in detail the purification of potable water flowing in a duct where the pressure and rate of flow is variable, due to variation in consumption, and the combination therewith of a chemical combining agent such as chlorin gas has been selected, and in this purification system whatever the mobile fluid and the chemical combining agent may be, a fixed ratio is first determined upon and while this may be changed from day to day, whatever ratio may be established is maintained until the occurrence of changed conditions is discovered, as by the application of proper tests, instituted for the purpose. The mobile fluid to be changed by the addition of some chemical agent may be any fluid or liquid and the chemical combining agent to be united therewith at a predetermined rate may be any suitable or desired chemical substance either in the form of a liquid a gas or a powder.

The accompanying drawings illustrate one embodiment of the invention which will serve to illustrate its principle.

Figure 1 is a schematic view of the general arrangement of the apparatus, and Fig. 2 shows a modification of the device which is controlled by the variation in the loss of weight of the source of supply.

The duct or main through which the water supply passes is shown at $w$; in operative relation to duct $w$ is a "flow indicator" or meter $m$, the variation in indications of which result in the mechanical movement of rod 10 which reciprocates, as shown by the arrows; so that its position varies with the rate of flow, which may be indicated on a scale 80, as shown. This rod 10 is connected with a long pinion 12 through a sliding connection 11, and on the same shaft with pinion 12 is a friction roller 13, engaging with the face of disk 14, on a shaft 15, driven at a constant speed from any source, such as motor 16, through bevel gears 17, 18. A disk 19 is fast on shaft 15, and disks 14 and 19 are thus rotated together at a constant speed. A friction roller 20 is driven by disk 19 and is on the same shaft with long pinion 21. A reciprocating rod 71 is connected with the shaft carrying long pinion 21, through a sliding connection 72; rod 71 is reciprocated in such manner that its position corresponds at any instant to the rate of flow of gas in weight per time unit, so that this may be indicated on a scale 81, as shown. For thus reciprocating rod 71 it is provided with gear teeth at 75 meshing with pinion 74, secured on a short shaft with worm wheel 73, which meshes with worm 76 driven in either direction by any motor device $d$; for example, motor $d$ may be an electric motor which has its armature coils constantly excited by a source of electric current $c$, and provided with two opposed field coils 61 and 62 to be referred to.

There is a reservoir $e$, filled with water 50. In this is a hollow float $f$, supporting a bottle $b$ of liquefied chlorin gas. The bottle $b$ is connected by a flexible tube $h$ with a gas valve $g$ which is shown as having a sliding gate 30 controlling the orifice of a tube 31; which tube leads thence to the water duct $w$. The gate 30 is operated by a sliding rod 29 as will be described.

The float $f$ rises as the gas passes off, and thus reduces the weight in the bottle $b$. Its rate of ascent is made to determine the position of the rod 71. This it does by controlling the movements of the motor $d$ in either direction. For this purpose the float $f$ carries (through a rigid rod 51) an electric contact 52, insulated from the rod at 53, and playing between two contacts 54 and 55. These latter are carried on a slowly ascending traveler $n$ which is propelled at a varying rate by being driven from the friction roller 20. The gearing shown comprises pinion 21, train 40 to 46 inclusive, and upright screw shaft 47, the threads of which engage a nut in the traveler $n$. Contacts 52, 54 and 55 are connected to battery $x$ and motor coils 61 and 62 by wires 60, 63, 64, 65 as shown.

The worms 24 and 25 are rotated in respectively opposite directions, as shown by the arrows, and when these worms rotate at the same rate (irrespective of their actual speed) the worm wheel 28, which freely rotates on a pivot carried by the forked end of the reciprocating rod 29, turns idly, and does not move the rod 29. If, however, either worm 24 or 25 varies its relative rate of movement, that is, turns faster or slower than the other, the rod 29 will be moved by the more rapidly rotating worm, whichever it may be, one way or the other.

To enable the operation to be understood, let us first assume a normal condition of operation in which a fluid, such as water, is flowing in the duct $w$ and chlorin gas is being delivered into duct $w$ at a predetermined rate, so that there is a definite ratio between the flow of the water and the flow of the gas (or whatever chemical agent may be used in place of the gas). A change in the rate of flow of the water in duct $w$ will cause a change in the position of the rod 10; if the flow is decreased rod 10 will move toward the left and indicate a lower rate of flow on the scale, shown in the drawings; rod 10 in this movement will move the long pinion 12 and the friction roller 13, the latter engaging the friction disk 14 at a shorter radial point. This will decrease the rate of movement of the roller 13 and there will result a difference in the relative speed of rotation of the worms 24 and 25; the worm 24 now rotates the faster, as compared with worm 25, and causes the worm wheel 28 to move toward the right, decreasing the orifice of the gas valve $g$ opening into the pipe 31. This decreases the rate of flow of the chlorin gas in the tube $h$ and the rate of loss of weight of the bottle $b$. In the operation of the apparatus up to this time, it is assumed that the rotation of the vertical threaded shaft 47, carrying the traveler $n$ upward, and the upward advance of the fixed contact 52, supported on float $f$, has been at such a rate that the position shown in the drawing, where the contact 52 is out of engagement with both contacts 54 and 55 has been maintained, but the decrease in the rate of loss of weight of bottle $b$ causes the contact 52 to be retarded and the contact 55 overtakes it, closing circuit via 52, 65, battery $x$, conductor 63, coil 62, conductor 64, and contact 55; this causes a rotation of the armature of motor $d$, and worm 76, in a direction to move sliding rod 71 toward the left and to cause friction roller 20 to engage friction disk 19 at a point nearer the center or on a shorter radius; this acts to slow down the rate of rotation of the vertical shaft 47 and separation between contacts 52 and 55 results; when contact 52 overtakes contact 54 circuit is closed via 52, 54, 60, 61, 63, $x$ and 65. This causes a rotation of the armature of the electric motor $d$ in the opposite direction and the radial point of contact of roller 20 with respect to disk 19 is lengthened, so that the speed of roller 20 is increased. Stated in another way, there is a sort of "hunting" action, or oscillation, until the point of equilibrium is substantially reëstablished.

The successful operation of the apparatus where variations occur in the water flow is dependent upon the loss in weight of the supply of chlorin gas, the area of the float and the proportion of the gearing. The gas storage bottle $b$ contains chlorin gas in a liquid form. Commercially such bottles will hold about 100 lbs. of liquid gas; bottle $b$ is placed in the hollow float $f$ of uniform section, preferably cylindrical; float $f$ is supported in water, 50, contained in reservoir $e$. As gas flows from bottle $b$ float $f$ will rise in proportion to the weight of gas removed. The linear distance through which float $f$ will rise for each pound of gas allowed to escape will depend upon the area of cross section of float $f$. For example, if the diameter of float $f$ is eight inches, the area of cross section would be about 50 square inches. Since about 27 cubic inches of water weighs one pound, float $f$ would rise a little over one-half inch for each pound of gas removed, or if bottle $b$ contained originally 100 pounds of gas, the total rise of the float after all the gas had been removed would be a little over 50 inches.

It is to be understood that the constituent elements of the mobile liquid, whether it be water or sewage, and the elemental, compound, or constituent character of the chemical agent to be combined with the said mobile liquid is or are not material; the method and means hereinafter claimed are not limited by the character or combination of the elemental substances employed or operated upon, but it is material that a substantially uniform ratio shall be maintained between the supply of one and the rate of flow of the other, and that this ratio shall be maintained until a different predetermined ratio of combination is determined upon.

In Fig. 2, scale springs $s$, in place of water, support the source of supply of the chemical combining substance, that is, the bottle $b$. In case a scale is employed, showing variations in the loss of weight of the source of supply, some movable mechanical element forming part of the scale will be arranged to operate the circuit closer 52 substantially as shown in Fig. 1.

The invention is susceptible of a wide range of modification.

The present application for patent is directed to the method or process. Claims covering generically the apparatus herein described are contained in a later application, Serial No. 780,954, filed July 24, 1913.

What I claim and desire to secure by Letters Patent is:

1. A process of purifying a liquid by introducing a chemical agent into a current of such liquid, comprising controlling the flow of said agent by means of its loss of weight.

2. A process of purifying water by introducing a gas into a current of such water, comprising controlling the flow of said gas by means of its loss of weight.

3. A process of purifying a liquid by introducing a chemical agent into a current of such liquid, comprising controlling the flow of such agent by means both of its loss of weight and of variations in the flow of said current.

4. A process of purifying water by introducing gas into a varying current of such water in a predetermined proportion, comprising controlling the flow of gas by means of its loss of weight, and controlling the rate of loss of weight by the rate of flow of the current of water.

5. A process of purifying water by introducing gas into a current of such water, comprising introducing such gas from a supply thereof under pressure, and controlling the flow of gas irrespective of its pressure by means of the loss of weight of such supply.

6. In the purification of water by introducing gas into a current of such water, the described method which consists in introducing such gas from a supply thereof under pressure, and controlling the flow of gas by means actuated by the rate of flow of said water and by the rate of the loss of weight of the supply of said gas.

7. In the purification of water by introducing gas into a current of such water, the described method which consists in introducing such gas from a supply thereof under pressure and at a rate irrespective of such pressure by varying the weight of the gas flowing per unit of time in proportion to variations in the rate of flow of the water.

8. In the purification of water by introducing gas into a current of such water, the described method which consists in introducing such gas from a supply thereof under pressure through a controlling valve, and varying the effective opening of said valve under control of the rate of flow of the water, and relatively to the pressure of the gas to admit a given weight of gas proportional to a given quantity of water.

In witness whereof, I have hereunto signed my name in the presence of two subscribing witnesses.

FRANK M. LEAVITT.

Witnesses:
ARTHUR C. FRASER,
FRED WHITE.